J. NEY.

MERRY-GO-ROUND.

APPLICATION FILED DEC. 18, 1913.

Reissued Apr. 28, 1914.

13,721.

2 SHEETS—SHEET 1.

Witnesses
Robert Karcher.
Sylvia Boron.

Inventor
Jacob Ney.
By Bond & Miller
Attorneys

J. NEY.

MERRY-GO-ROUND.

APPLICATION FILED DEC. 18, 1913.

Reissued Apr. 28, 1914.

13,721.

2 SHEETS—SHEET 2.

Witnesses
Robert Karcher.
Sylvia Boron.

Inventor
Jacob Ney.
By Bond & Miller
Attorneys

COLUMBIA PLANOGRAPH CO., WASHINGTON, D. C.

UNITED STATES PATENT OFFICE.

JACOB NEY, OF CANTON, OHIO.

MERRY-GO-ROUND.

13,721. Specification of Reissued Letters Patent. Reissued Apr. 28, 1914.

Original No. 1,014,249, dated January 9, 1912, Serial No. 641,318. Application for reissue filed December 18, 1913. Serial No. 807,555.

*To all whom it may concern:*

Be it known that I, JACOB NEY, a citizen of the United States, residing at Canton, in the county of Stark and State of Ohio, have invented certain new and useful Improvements in Merry-Go-Rounds, of which the following is a specification.

This invention relates to a pleasure device commonly known as merry-go-rounds and has for its objects; first, to provide means whereby the device is actuated by the occupants and second, to provide means whereby motion is imparted by the movements of the persons and at the same time the weight of the persons is employed or used to impart horizontal rotary movement to the merry-go-round. These objects together with other objects readily apparent to those skilled in the art, I attain by the construction illustrated in the accompanying drawings, although my invention may be embodied in a variety of other mechanical forms, the construction illustrated being chosen by way of example.

Figure 1:
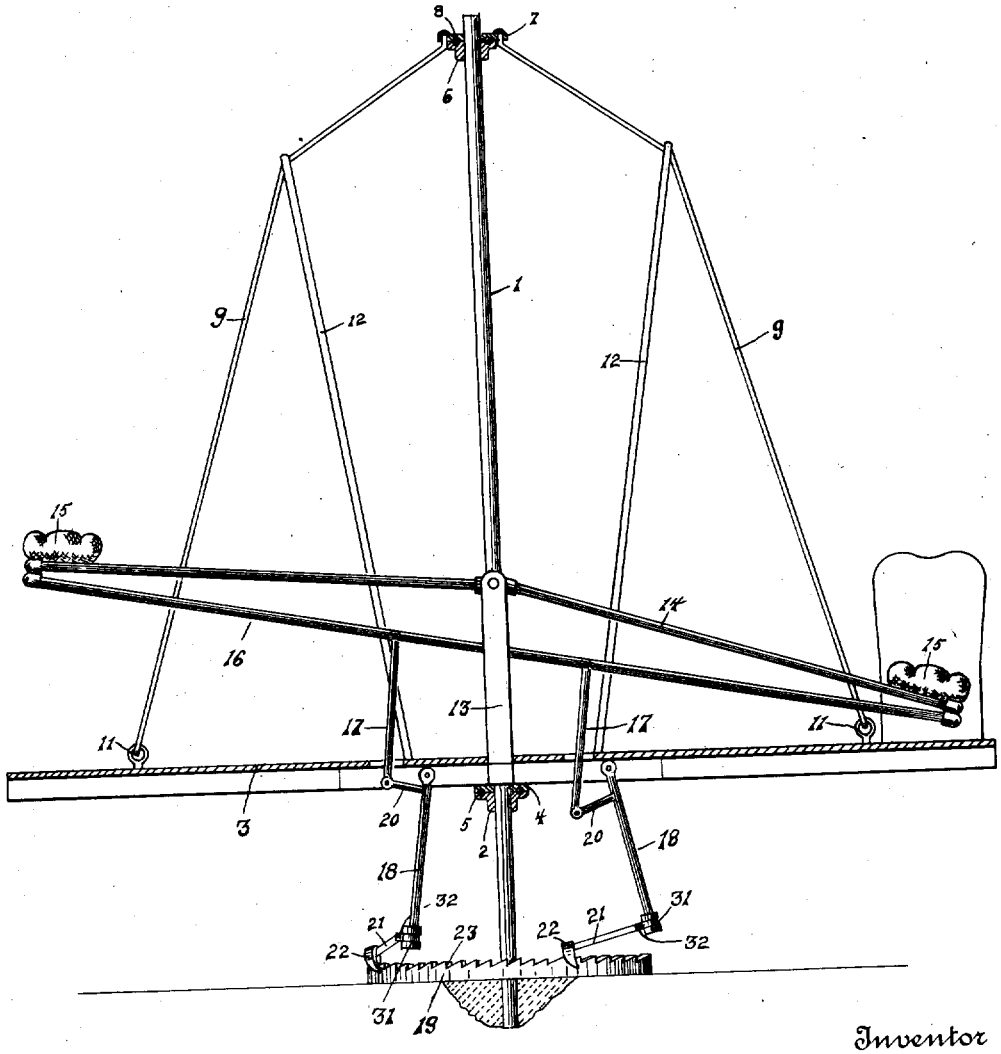
Figure 3:
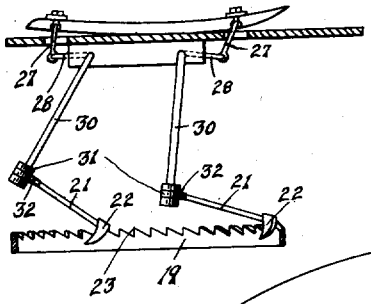
Figure 2:
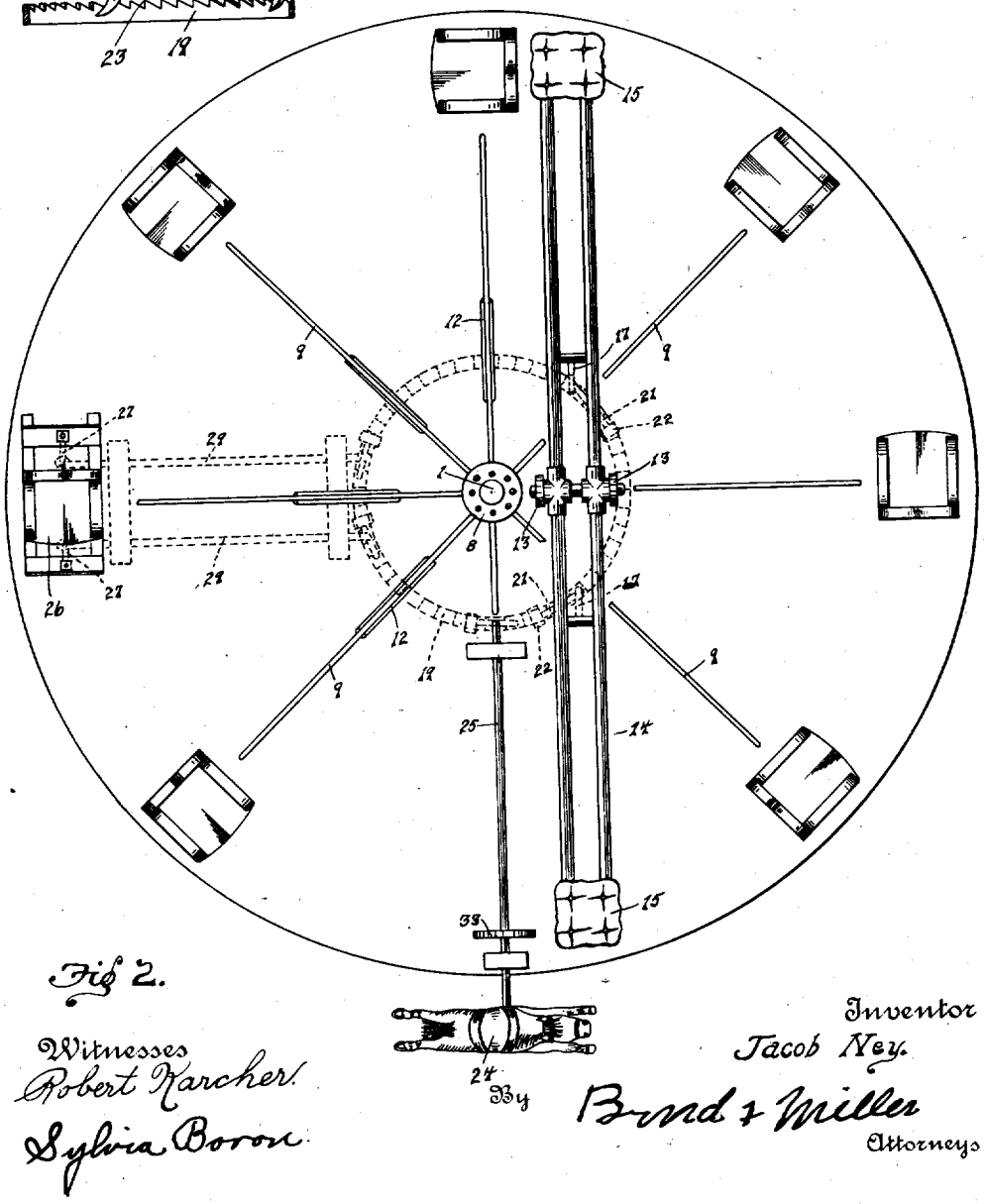

In the accompanying drawings,—Figure 1 is a vertical section of the revolving platform or frame, showing the see-saw properly mounted, also showing the devices for imparting rotary movement by the action of the see-saw. Fig. 2 is a top view. Fig. 3 is a view showing a portion of the platform and a portion of a rocking chair illustrating the connection with the toothed ring.

Similar numerals of reference indicate corresponding parts in all the figures of the drawing.

In the accompanying drawing, 1 represents the center pole or post around which the movable parts revolve. This center pole or post is securely seated in the ground or frame work and in such a manner that it will properly support and carry the movable parts and at the same time maintain a rigid position. At a convenient distance from the ground or floor is located the bearing head or plate 2, which is securely connected in any convenient and well known manner to the pole or post 1. Upon the bottom or underside of the revolving platform 3 is attached the bearing plate 4, which bearing plate in the present instance rests upon the anti-friction balls 5. The purpose of the parts just above described is to provide means for rotatably mounting the platform 3 and so mounting said platform that it will rotate freely and at the same time be supported in proper elevation.

To the top or upper portion of the pole or post 1 and above the platform is located the bearing block 6, which is securely attached in any convenient and well known manner. Upon this block is rotatably mounted the plate 7, which plate rests upon the ball bearings 8 or their equivalents and is designed to rotate in a horizontal plane and in unison with the platform 3. From the revolving plate 7 extend the supporting members 9, which supporting members are extended downward and their lower ends connected to the platform 3 by means of the eye-bolts 11 or their equivalents.

For the purpose of centering the weight or in other words to provide means whereby the weight carried by the platform and by the see-saw will be centralized a number of uprights 12 are provided, which uprights are connected to the platform at their bottom or lower ends and upon their upper ends rest the supporting members 9. These uprights 12 are so arranged that the down pull of the members 9 will transfer the weight toward the center of the platform 3.

At one side of the post or pole 1 are located the posts 13, which posts are connected to the platform and moved with the platform. To the top or upper end of the post 13 is pivotally attached the see-saw 14, which see-saw is formed of a length to correspond substantially with the diameter of the platform. In the drawings the see-saw is shown somewhat shorter than the extreme diameter of the platform. To the ends of the see-saw are connected in any convenient and well known manner the seats 15. To the under member 16 of the see-saw or its equivalent are pivotally connected at their upper ends the links 17, said links being located upon opposite sides of the pivotal point of the see-saw, which links move up and down with the rocking movement of the see-saw.

To the bottom or underside of the platform 3 are pivotally connected the swinging or oscillating arms or rods 18, which swinging or oscillating rods are extended downward to a point near the top of the toothed ring 19, which toothed ring is securely fixed to the ground or floor in any convenient or well known manner, but in such a manner that it will not rotate or be moved out of position by reason of the force exerted upon said ring during the time rotary motion is imparted to the platform 3 and the different parts carried by the platform. To the swinging or oscillating rods 18 are attached or formed integral therewith the lever arms 20, to which lever arms are pivotally attached the bottom or lower ends of the links 17. It will be understood that when oscillating movement is imparted to the see-saw proper a swinging or oscillating movement will be imparted to the rods 18 by means of the links 17 and the lever arms 20.

To the bottom or lower ends of the swinging or oscillating rods 18 are pivotally attached the push bars 21, to which push bars are attached the push heads 22, which push heads are so arranged that they will engage the vertical edges of the teeth 23 when a pushing force is applied to the push rods 21, but when a pulling action or force is applied to the push rods the push heads will ride over the inclined portions of the teeth 23, the push heads passing over a number of teeth of the toothed ring, the number of teeth passed over by the push heads being fixed or determined by the backward throw of the swinging or oscillating rods 18. It will be understood that when the see-saw is rocked to the limit of its movement a greater number of teeth will be passed by the push heads than when the see-saw is only rocked but a partial distance of its extreme movements. During the rocking movement of the see-saw, one of the push rods and its push head is brought into action to force the platform 3 together with its different parts so as to cause said platform to rotate in a horizontal plane. The other push rod and its push head will be carried or swung backward, which backward movement takes place during the down thrust of the see-saw, and the pushing or propelling action of the push rod and its head takes place during the upward thrust of the see-saw. The object and purpose of so arranging the parts that the pushing action will take place during the upward movement or thrust of the see-saw is to give to the links 17 a pulling action rather than a pushing one during the time the push heads are forced against the vertical portions 23, formed in the upper edge of the toothed ring 19.

In order that more than two persons may ride upon the merry-go-round and assist in propelling the same rocking horse or rocking chairs may be provided, the number being governed by the size of the merry-go-round designed to be constructed. In Fig. 2 there is illustrated a rocking chair and a rocking horse arranged in such a manner that the oscillating movements of the rocking chair and the rocking horse will be utilized to propel or impact horizontal rotary movement to the merry-go-round proper. The rocking horse 24 is securely mounted upon the rock shaft 25, which rock shaft extends inward and is provided with a push rod similar in construction to the push rods 21 and is also provided with a push head 22. The rocking chair 26 is located upon the top of the platform and is provided with links 27, which links are extended down and pivotally connected at the bottom or lower ends to the lever arms 28, which lever arms are extended at an angle to the rock shafts 29, which rock shafts are extended inward and provided with the downward extended portions 30 to which downward extended portions are connected push rods 21, said push rods being provided with the push heads 22. The push rods 21 and push heads 22 are the same in construction as the push rods and push heads illustrated in Fig. 1.

It will be understood that owing to the fact that the toothed ring 19 is circular when rotary motion is imparted to the merry-go-round proper, the parts connected thereto travel in what might be termed concentric circles. But owing to the fact that there is a swinging or oscillating movement of the rods 18 and the downward extended portions 30 said swinging and oscillating movement necessarily being in a vertical plane, provision must be made for horizontal pivotal movement of the push rods 21 and in order to provide for this the push rods are journaled to the bottom or lower ends of the rods 18 and to the downward extended rods 30. It will also be understood that the lower ends of the rods 18 and the downward extending portions or rods 30 will move in the arc of a circle and consequently it is necessary to provide means to prevent the push heads from being lifted at any time from the teeth of the toothed ring, consequently it is necessary to provide compound joints or pivotal points 31 and 32, the joints 32 permitting a vertical movement of the push rods 21 and the joints 31 allowing a horizontal movement of said push rods 21, by which movements the push heads 22 are free to travel in a true circle over and upon the teeth of the toothed ring.

For the purpose of providing what might be termed a yielding movement for the rocking horse 24 and assisting in preventing the excessive rocking of the horse the spring 33 is provided, which spring is connected to the shaft in any convenient and well known manner and the ends of the spring adapted to come and go to and from the top of the platform proper, by which arrangement the rocking movement of the horse 24 will be limited, the spring acting as a stop against the rocking movement of the horse.

Having fully described my invention what

I claim as new and desire to secure by Letters Patent, is—

1. In a merry-go-round of the class described, the combination of a horizontal revolving platform, a see-saw mounted upon and carried by the revolving platform, rods pivotally connected to the revolving platform, said rods provided with lever arms, links connected to the lever arms and to the see-saw, push rods pivotally connected to the bottom or lower ends of the rods pivoted to the platform, and push heads connected to the push rods, a fixed toothed ring located below the revolving platform the teeth of the toothed ring being adapted for engagement with the push heads, substantially as and for the purpose specified.

2. In a merry-go-round of the class described, the combination of a horizontally revolving platform, a fixed toothed ring located below the platform, push heads adapted for engagement with the fixed toothed ring, rods connected to the push heads and means carried by the revolving platform adapted to impart movements to the push rods and push heads independent of the horizontal rotary movement of the push heads upon the toothed ring, substantially as and for the purpose specified.

3. In a merry-go-round, the combination of a fixed post, a revolving platform carried by said fixed post, a series of uprights extending from the platform, a revolving plate located at the top or upper end or portion of the post, a series of supporting members fixed to the revolving plate and to the platform respectively, a fixed toothed ring located below the platform, a see-saw carried by the platform and rotatable therewith, and means intermediate the see-saw and the fixed toothed ring adapted to impart rotary movement to the platform and see-saw, substantially as and for the purpose specified.

4. A merry-go-round comprising a rotatable mounted structure, oscillating elements carried by said rotary structure and rotatable therewith, said oscillating elements provided with seats, a fixed toothed ring located below the rotatable mounted structure, and means actuated by the oscillating elements carried by the rotatable mounted structure adapted for engagement with the teeth of the fixed toothed ring, substantially as and for the purpose specified.

5. In a device of the character described, the combination of a rotatable structure, a support for said rotatable structure, an oscillating element mounted upon and carried by said rotatable structure, a ring and means intermediate said rotatable structure and oscillating element and said ring adapted to intermittently impart rotary motion to said rotary structure by intermittent engagement with said ring.

6. In a device of the character described, the combination of a horizontal rotatable platform, a see-saw pivotally mounted upon and carried by the revolving platform, rods pivotally connected to the revolving platform, said rods provided with lever arms, links connected to the lever arms and to the see-saw, push rods pivotally connected to the bottom or lower ends of the rods pivoted to the platform, push heads connected to the push rods, a ring adapted for engagement with the push heads.

7. In a device of the character described, the combination of a horizontal rotatable platform, a see-saw mounted upon and carried by the revolving platform, rods pivotally connected to the revolving platform, said rods provided with lever arms, links connected to the lever arms and to the see-saw, push rods pivotally connected to the bottom or lower ends of the rods pivoted to the platform, push heads connected to the push rods, a ring adapted for intermittent and alternate engagement with the push heads.

8. In a device of the character described, the combination of a horizontal platform, a see-saw mounted upon and carried by said platform, rods pivotally connected to the platform, said rods provided with lever arms, links connected to the lever arms and to the see-saw, push rods pivotally connected to the bottom or lower end of the rods pivoted to the see-saw, push heads connected to the push rods, a ring adapted for intermittent and alternate engagement with the push rods, a ring adapted for intermittent and alternate engagement with the push heads.

In testimony that I claim the above, I have hereunto subscribed my name in the presence of two witnesses.

JACOB NEY.

Witnesses:
SYLVIA BORON,
F. W. BOND.

Copies of this patent may be obtained for five cents each, by addressing the "Commissioner of Patents, Washington, D. C."